(12) United States Patent
Fierling

(10) Patent No.: US 6,200,038 B1
(45) Date of Patent: Mar. 13, 2001

(54) CAGE FOR RIGID BALL BEARING AND ASSOCIATED BALL BEARING

(75) Inventor: Yannick Fierling, Petit-Rederching (FR)

(73) Assignee: SKF France (FR)

( * ) Notice: Subject to any disclaimer, the term of this patent is extended or adjusted under 35 U.S.C. 154(b) by 0 days.

(21) Appl. No.: 09/403,299

(22) PCT Filed: Feb. 15, 1999

(86) PCT No.: PCT/FR99/00329
§ 371 Date: Oct. 20, 1999
§ 102(e) Date: Oct. 20, 1999

(87) PCT Pub. No.: WO99/43964
PCT Pub. Date: Sep. 2, 1999

(30) Foreign Application Priority Data

Feb. 24, 1998 (FR) .................................................... 98 02215

(51) Int. Cl.[7] .................................................... F16C 33/49
(52) U.S. Cl. .................................................... 384/531
(58) Field of Search .................................... 384/523, 528, 384/531, 532, 533, 534

(56) References Cited

U.S. PATENT DOCUMENTS

| 4,493,513 | * | 1/1985 | Osawa et al. | 384/533 |
|---|---|---|---|---|
| 4,702,627 |   | 10/1987 | Pollastro | 384/526 |
| 4,838,712 | * | 6/1989 | Kubo et al. | 384/523 |
| 5,015,105 | * | 5/1991 | Ueno | 384/531 |
| 5,642,945 |   | 7/1997 | Abe | 384/470 |
| 5,722,780 | * | 3/1998 | Scharman | 384/531 |
| 5,906,441 | * | 5/1999 | Seki | 384/528 |

FOREIGN PATENT DOCUMENTS

| 2 574 140 | 6/1986 | (FR) . |
| 1186856 | 4/1970 | (GB) . |
| 2 066 381 | 7/1981 | (GB) . |
| 2 147 665 | 5/1985 | (GB) . |
| 2 306 582 | 5/1997 | (GB) . |

* cited by examiner

Primary Examiner—Thomas R. Hannon
(74) Attorney, Agent, or Firm—Smith, Gambrell & Russell, LLP

(57) ABSTRACT

The invention concerns a cage device (17) for maintaining balls in a ball bearing comprising at least a row of balls arranged between two raceways, said cage comprising a ring-shaped part (18) axially adjacent to said balls and a plurality of slots (22) in each of which is arranged a ball, a slot being formed by a concave surface, the slots being open on the side opposite the ring and separated by spacing portions (19) extended opposite the ring by lips (21). The concave surface comprises a truncated portion (24) connected to the spherical portion (23).

21 Claims, 4 Drawing Sheets

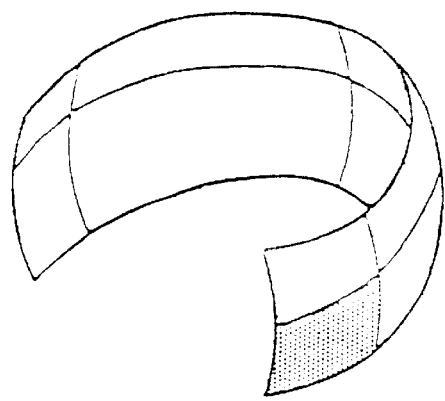
FIG.4 (PRIOR ART)
(PRIOR ART) FIG.5
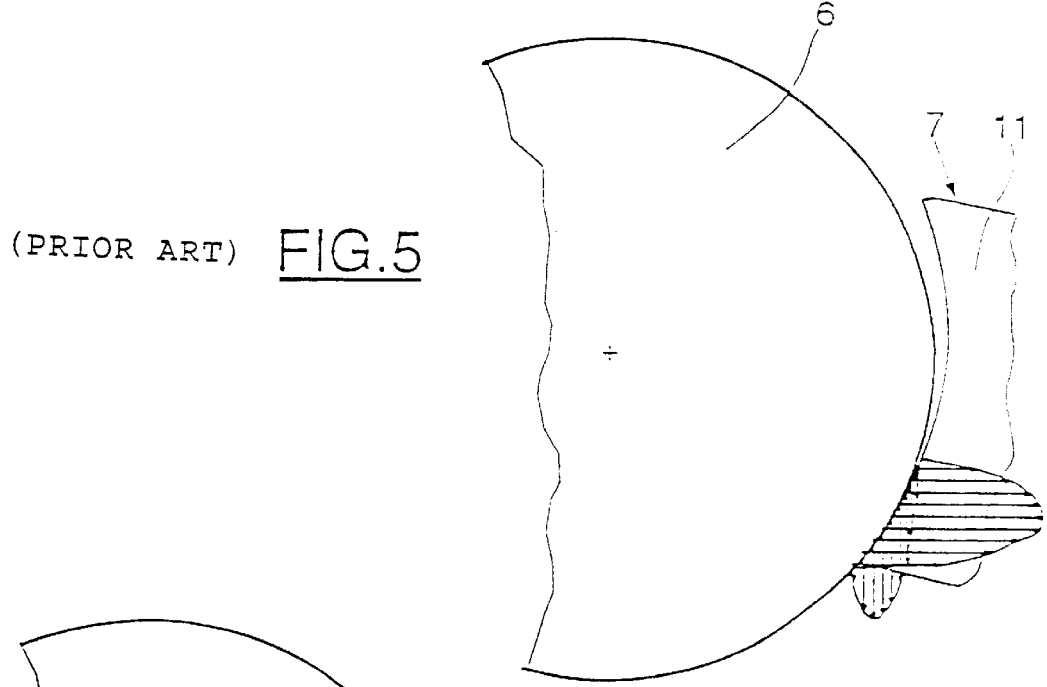
FIG.6
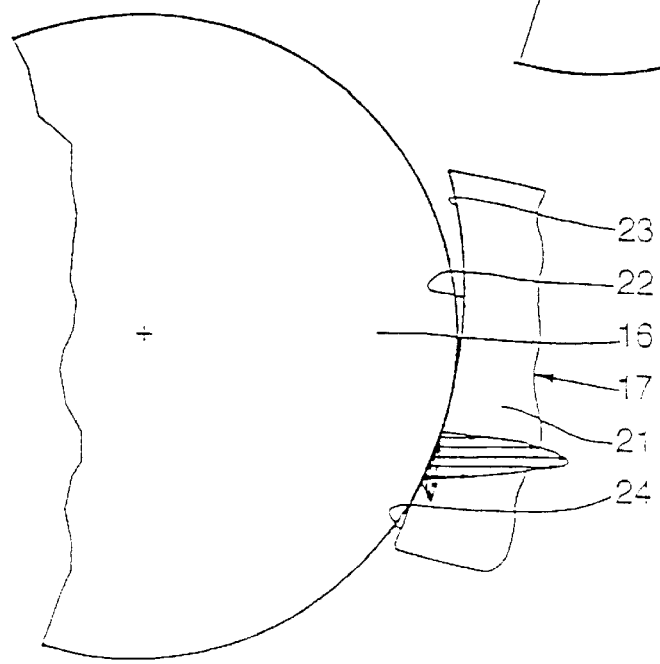

CAGE FOR RIGID BALL BEARING AND ASSOCIATED BALL BEARING

The present invention relates to the field of cages made of synthetic material which are intended for rigid ball-bearings.

The cages used in bearings are intended to constantly maintain a uniform circumferential spacing between the rolling bodies.

Cages made of synthetic material are produced by injection moulding a plastic, for example nylon-6,6, which may or may not be filled with reinforcing material such as glass fibre.

These cages consist of an annular ring with spherical slots open axially on one face of the ring and radially on both sides of the ring, each slot being extended axially by lips which extend in a direction which is axially away from the closed end of the slot.

A cage of this type is mounted by axial snap-fitting over the row of balls of the bearing, the said balls fitting into the slots with a very small amount of play. The enveloping spherical shape of the slots holds the cage axially over the row of balls and allows the cage to be centred with respect to the bearing races.

These cages are economical to manufacture, low in mass and do not suffer from corrosion problems. However, in certain applications entailing severe load and speed conditions, it has been found that these cages may exhibit premature failure, particularly breakage of the cage in the heel region.

Surprisingly, it has been found that these breakages were due to particularly high wear in the region of the interior edges of slots in the region of the lips lying in the direction of rotation of the bearing, under the effect of centrifugal force and the applied loads.

The interior edges of the slots are understood as meaning those edges of the slots which are located towards the axis of rotation of the bearing.

The bottom part of the slot is understood as meaning that part of the slot which is closest to the axis of rotation of the bearing.

It has thus been found that under certain speed and load conditions, the critical area of contact between balls and slots was located in the lower part of the slot, in the region of the lips in the direction of rotation of the bearing. So-called "edge" contacts between ball and slot occur in these critical regions, these contacts resulting from the bearing load and rotational speed conditions. The edge contacts occur at a sharp edge and therefore arise under conditions which are very bad both from the contact pressure point of view and from the local lubrication conditions point of view. Upon contact with the ball, the slot edge which is relatively flexible, will tend to deform. This deformation, combined with the high contact pressures, the friction generated by the rotation of the ball, and poor lubrication of the contact region, leads to premature slot wear.

The object of the present invention will be to overcome the drawbacks of this conventional cages and to propose a cage, the slot shape of which allows the ball-slot contact conditions to be improved by moving the region of contact away from the sharp edge.

The cage device according to the invention is of the type intended to hold balls in a bearing comprising at least one row of balls arranged between two raceways. The cage comprises a ring-shaped part axially adjacent to the balls and a number of slots in each of which a ball is arranged. A slot is formed by a concave surface, the slots being open axially on one face of the ring and radially on both sides of the ring, the said slots being separated by spacing parts extended on the opposite side to the ring by lips. The concave surface comprises a truncated-conical portion which meets a spherical portion.

In one embodiment of the invention, the truncated-conical portion is arranged along the interior edge of the slot and meets the spherical portion which occupies the rest of the concave surface, the conical portion closing up in the direction towards the axis of revolution of the cage. The spherical portion is arranged on the exterior edge of the cage. The region of ball-slot contact is thus moved away from the interior edges of the slot, thus avoiding the edge contacts at sharp corners between balls and slots, and this considerably improves the contact pressure characteristics in this area with, as a consequence, appreciably reduced cage wear. Furthermore, lubrication is thereby improved because of the conical shape at the base of the slot which offers the lubricant more space. A reservoir of lubricant which is entirely beneficial to the correct running of the bearing thus forms at the base of the slot. Compared with a conventional cage, the cage according to the invention maintains its ability to hold the balls in the slots of the cage both in the axial direction and in the radial direction.

In one embodiment of the invention, the truncated-conical portion meets the spherical portion tangentially.

In another embodiment of the invention, the truncated-conical portion meets the spherical portion along a secant, preferably forming a re-entrant angle or a hollow.

Advantageously, the angle $\alpha$ of the truncated-conical portion is between 0 and $\pi-2\arcsin(2 \times X/D_a)$, $D_a$ being the diameter of the slot and X being equal to $\sqrt{(D_{i/2})^2 - Y^2}$ with $Y = (D_i^2 + D_p^2 - D_a^2)/(4 \times D_p)$, $D_i$ being the diameter of the bore of the cage, $D_p$ being the diameter of the circle passing through the centres of the spherical portions of the slots.

The distance d between the base of the truncated cone and the centre of the spherical portion of the slot is between zero and $D_p/2 - Y$, $D_p$ being the diameter of the circle passing through the centres of the spherical portions of the slots, Y being equal to $(D_i^2 + D_p^2 - D_a^2)/(4 \times D_p)$.

The diameter B of the base of the truncated cone is between $2 \times X$ and $D_a$, $D_a$ being the diameter of the slot.

The present invention also relates to a ball-bearing comprising a cage as defined hereinabove.

The cage will thus offer resistance to wear because of the improved so-called "edge" contacts between the balls and the cage and because of the better lubrication, thereby reducing the risk of premature bearing failure through cage breakage.

The present invention will be better understood from studying the detailed description of one embodiment which is taken by way of entirely non-limiting example and illustrated by the appended drawings, in which:

FIG. 4 is a diagrammatic view of the slot-ball contact surface in a conventional cage;

FIG. 5 is a diagrammatic view showing the distribution of contact pressures in two perpendicular directions in the case of a conventional cage;

FIG. 6 is a view similar to FIG. 5 for the cage according to the invention;

Figure 1:
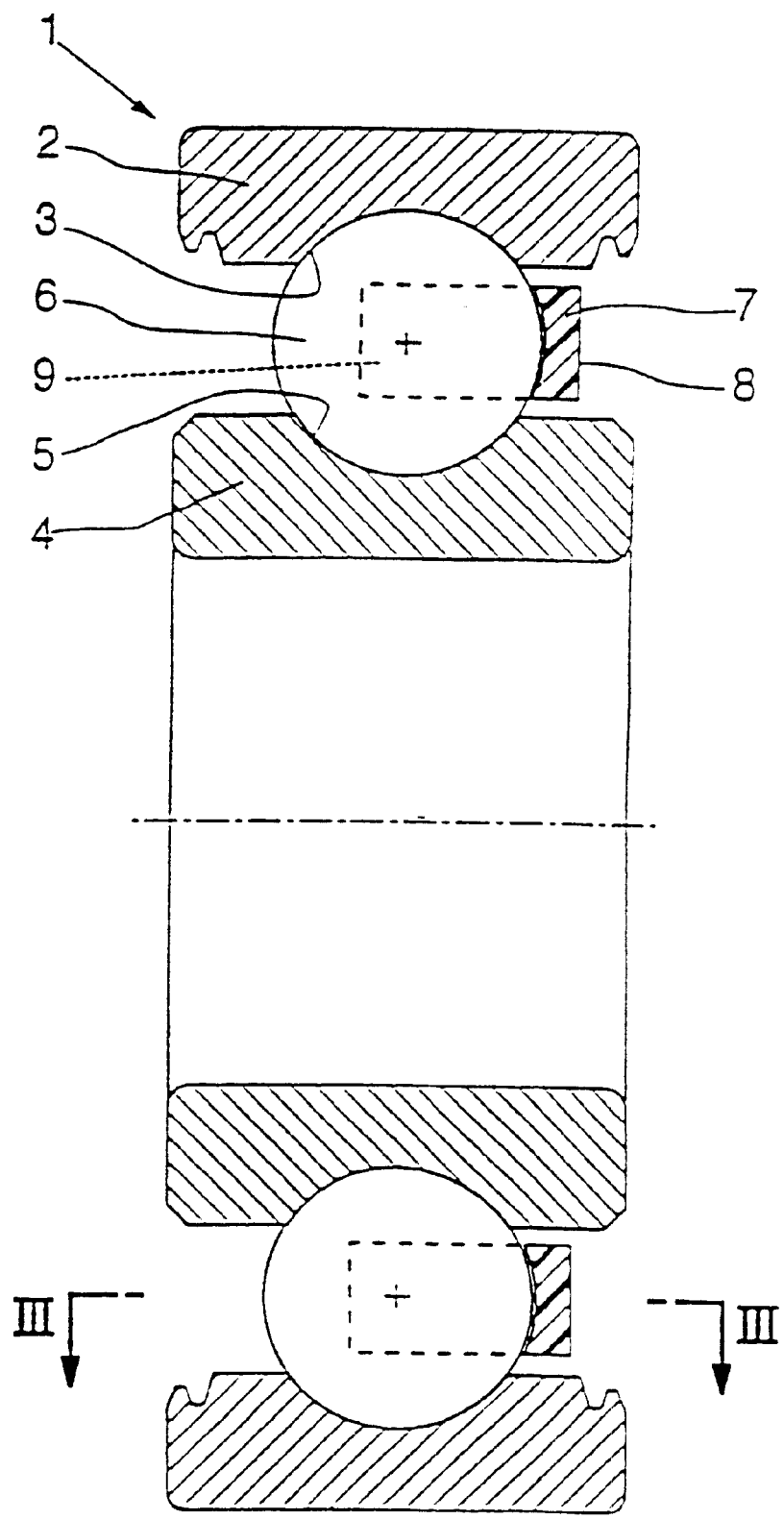
FIG. 1 is a view in axial section of a conventional ball-bearing.
Figure 2:
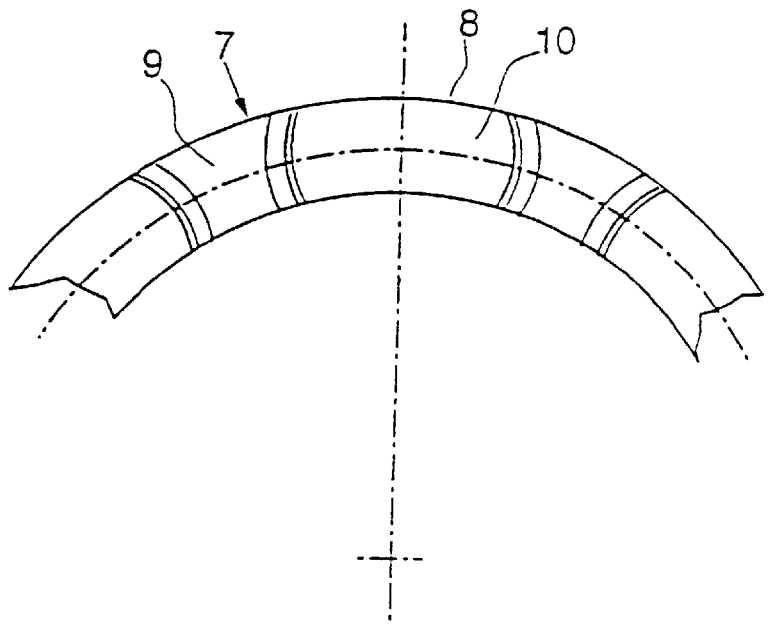
FIG. 2 is a partial front view of a conventional cage.
Figure 3:
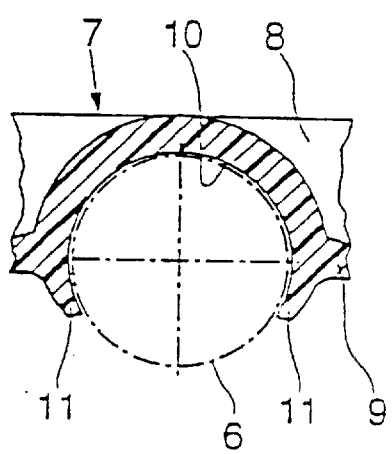
FIG. 3 is a view in section on III—III of FIG. 1.

As can be seen in FIGS. 1 to 3, the bearing 1 of conventional type comprises an outer race 2 provided, on its bore, with a torus-shaped raceway 3, an inner race 4 provided on its outer surface with a torus-shaped raceway 5, and a row of rolling bodies 6, for example balls, arranged between the raceway 3 of the outer race 2 and the raceway 5 of the inner race 4.

The row of rolling bodies 6 is held by a cage 7 made of synthetic material and comprising a ring-shaped part 8 arranged between the outer race 2 and inner race 4 on one side of the row of rolling bodies 6, and spacing parts 9 arranged between the said outer race 2 and inner race 4 and between the rolling bodies 6. The ring 8 and the spacing parts 9 define a number of evenly circumferentially distributed spherical slots 10 in each of which a rolling body 6 is arranged. The spacing parts 9 end axially on the opposite side to the ring 8 in lips 11 which hold the cage 7 with respect to the rolling bodies 6.

FIG. 4 depicts the theoretical contact surface between a slot and a rolling body. To study the behaviour of the cage, this surface has been divided into a number of sectors. It has been found that the sector shaded in grey witnessed the highest contact pressures between cage and rolling body. This sector shaded in grey corresponds to the interior edge of the slot near a lip of the cage lying in the direction of rotation.

The contact pressures in two perpendicular directions between rolling body and cage are depicted in FIG. 5. It can be seen that these pressures are relatively high and that they occur in the region of the corner of the interior edge of the slot.

By contrast, as can be seen in FIG. 6, the contact pressures exerted between a rolling body and a cage according to the invention are far lower, particularly in the radial direction, and occur a certain distance from the corner of the interior edge of the slot.

Figure 7:
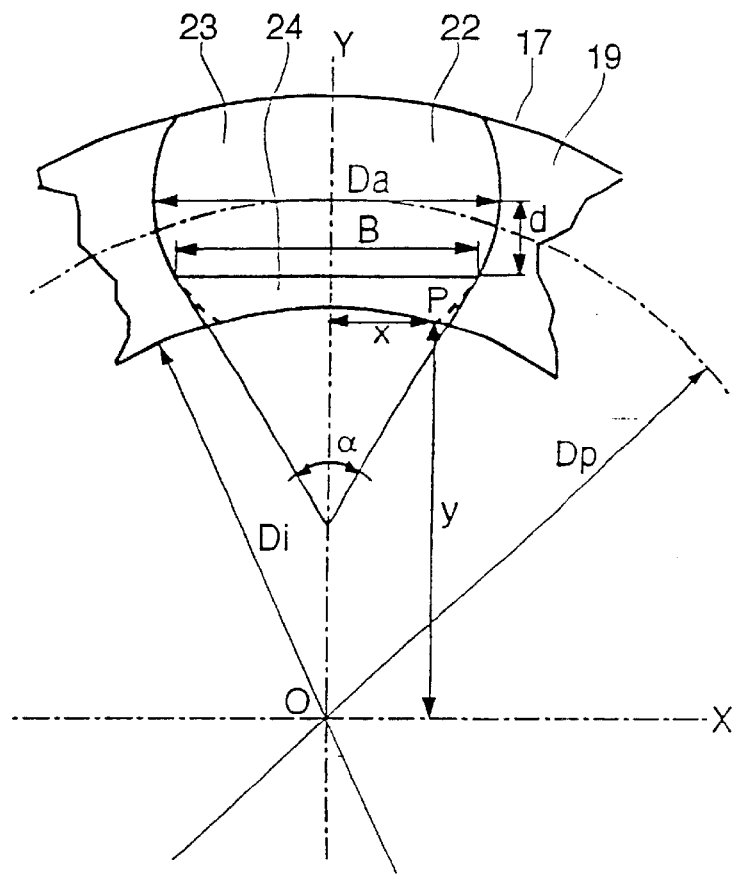
FIG. 7 is a partial view in cross section of a cage according to the invention.
Figure 8:
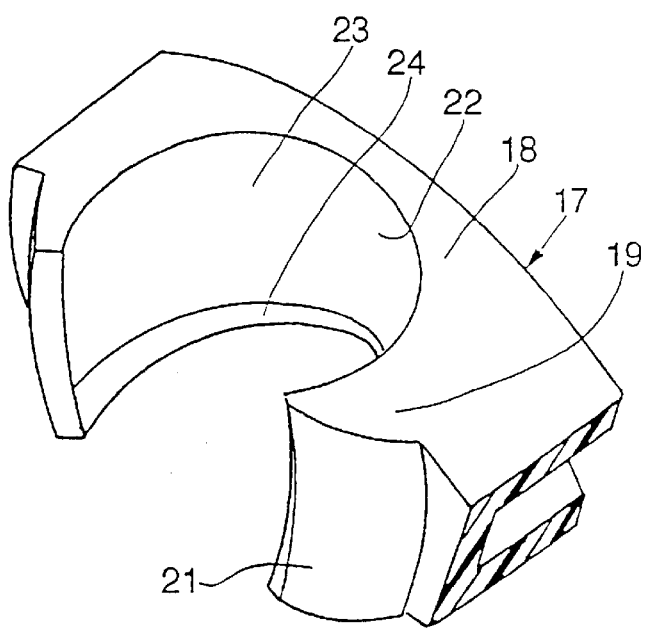
FIG. 8 is a perspective view of a cage according to the invention.

As can be seen in FIGS. 6, 7 and 8, the references of elements which are similar to those of the preceding figures have been increased by the number 10. The cage 17 comprises concave slots 22 provided with a truncated-conical portion which meets a spherical portion 23. The truncated-conical portion 24 is arranged on the interior edge of the slot of the cage and closes up towards the axis of revolution of the cage, the spherical portion 23 occupying the rest of the slot. This truncated-conical portion 24 may either meet this spherical portion 23 tangentially or along a secant, forming an angle of a few degrees. It can be clearly seen, particularly in FIG. 6, that the amplitude of the contact pressures is appreciably reduced, particularly as far as the radial components which have a strong influence on wear phenomena are concerned.

It will also be noted that ball-cage contact occurs away from the sharp corner delimiting the interior edge of the slot. Furthermore, at this interior edge, there is still a small space between the rolling body 16 and the truncated-conical portion 24 of the slot 22 which space forms a reservoir for lubricant which is favourable to the correct running of the bearing.

The following perimeters:

$D_a$—the diameter of a slot;

$D_i$—the diameter of the bore of the cage;

$D_p$—the diameter of the circle passing through the centre of the spherical portions of the slots have been chosen to define the respective possible dimensions of the spherical portion 23 and of the truncated-conical portion 24.

If the cage is sectioned on a plane passing through the centres of the spherical surfaces of the slots, then an orthonormal YOX system of axes contained in the sectioning plane can be defined for each slot, O being located on the axis of rotation of the cage, the axis OY passing through the centre of the slot, and the axis OX being perpendicular to the axis OY at O.

If P is used to denote the theoretical point of intersection between the sphere of the slot and the bore of the cage in the sectioning plane, the abscissa of the point P will be denoted by X, and the ordinate of the point P will be denoted by Y, relative to the YOX system of axes.

B is the diameter of the base of the truncated cone, that is to say the diameter at the point where the truncated-conical portion meets the spherical portion;

d is the distance between the base of the truncated cone and the centre of the spherical portion of the slot;

α is the truncated-cone cone angle.

To obtain a cage which operates satisfactorily, the following ranges of variation will preferably be chosen:

$0 \leq \alpha \leq \pi - 2 \arcsin(2 \times X/D_a)$ $0 \leq d \leq D_p/2 - Y$ $2 \times X \leq B \leq D_a$ with $X \sqrt{(D_{i/2})^2 - Y^2}$ and $Y = (D_i^2 + D_p^2 - D_a^2)/(4 \times D_p)$.

The invention therefore provides a cage in which the region of contact between balls and slots is away from the interior edges of the slots, which avoids edge contacts at sharp corners, thus considerably improving the contact pressure characteristics in this area. Cage wear is significantly reduced. This advantage is enhanced by the improvement in the lubrication which is due to the conical shape of the base of the slot which offers more space for the lubricant.

What is claimed is:

1. Cage device (17) of the type intended to hold balls (16) in a bearing comprising at least one row of balls arranged between two raceways, the said cage comprising a ring-shaped part (18) axially adjacent to the balls and a number of slots (22) in each of which a ball is arranged, a slot being formed by a concave surface, the slots being open axially on one face of the ring and radially on both sides of the ring, the said slots being separated by spacing parts (19) extended on the opposite side to the ring by lips (21), the concave surface comprising a truncated-conical portion (24) which meets a spherical portion (23), characterized in that the truncated-conical portion is arranged on the interior edge of the slot of the cage and closes up in the direction towards the axis of revolution of the cage, the spherical portion occupying the rest of the slot.

2. Device according to claim 1, characterized in that the truncated-conical portion meets the spherical portion tangentially.

3. Device according to claim 2, characterized in that the angle α of the truncated-conical portion is between zero and $\pi - 2 \arcsin(2 \times X/D_a)$, X being equal to $\sqrt{(D_{i/2})^2 - Y^2}$ and Y being equal to $(D_i^2 + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

4. Device according to claim 2, characterized in that the distance d between the base of the truncated cone and the centre of the sperical portion of the slot is between zero and $D_p/2 - Y$, $D_p$ being the diameter of the circle passing through the centres of the spherical portions of the slots, Y being equal to $(D_i^2 + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

5. Device according to claim 2, characterized in that the diameter B of the base of the truncated cone is between $2 \times X$ and $D_a$.

6. Ball-bearing comprising a cage according to claim 2.

7. Device according to claim 1, characterized in that the truncated-conical portion meets the spherical portion along a secant.

8. Device according to claim 7, characterized in that the angle $\alpha$ of the truncated-conical portion is between zero and $\pi - 2 \arcsin(2 \times X/D_a)$, X being equal to $\sqrt{(D_{i/2})^2 - Y^2}$ and Y being equal to $(D_i + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

9. Device according to claim 7, characterized in that the distance d between the base of the truncated cone and the centre of the sperical portion of the slot is between zero and $D_p/2 - Y$, $D_p$ being the diameter of the circle passing through the centres of the spherical portions of the slots, Y being equal to $(D_i^2 + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

10. Device according to claim 7, characterized in that the diameter B of the base of the truncated cone is between $2 \times X$ and $D_a$.

11. Ball-bearing comprising a cage according to claim 7.

12. Device according to claim 1, characterized in that the angle $\alpha$ of the truncated-conical portion is between zero and $\pi - 2 \arcsin(2 \times X/D_a)$, X being equal to $\sqrt{(D_{i/2})^2 - Y^2}$ and Y being equal to $(D_i + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

13. Device according to claim 12, characterized in that the distance d between the base of the truncated cone and the centre of the sperical portion of the slot is between zero and $D_p/2 - Y$, $D_p$ being the diameter of the circle passing through the centres of the spherical portions of the slots, Y being equal to $(D_i^2 + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

14. Device according to claim 12, characterized in that the diameter B of the base of the truncated cone is between $2 \times X$ and $D_a$.

15. Ball-bearing comprising a cage according to claim 12.

16. Device according to claim 1, characterized in that the distance d between the base of the truncated cone and the centre of the spherical portion of the slot is between zero and $D_p/2 - Y$, $D_p$ being the diameter of the circle passing through the centres of the spherical portions of the slots, Y being equal to $(D_i^2 + D_p^2 - D_a^2)/(4 \times D_p)$, $D_a$ being the diameter of the slot, $D_i$ being the diameter of the bore of the cage, $D_p$ being the diameter of the circle passing through the centres of the spherical portions of the slots.

17. Device according to claim 16, characterized in that the diameter B of the base of the truncated cone is between $2 \times X$ and $D_a$.

18. Ball-bearing comprising a cage according to claim 16.

19. Device according to claim 1, characterized in that the diameter B of the base of the truncated cone is between $2 \times X$ and $D_a$.

20. Ball-bearing comprising a cage according to claim 19.

21. Ball-bearing comprising a cage according to claim 1.

\* \* \* \* \*